US010549318B2

(12) United States Patent
Benedetti

(10) Patent No.: US 10,549,318 B2
(45) Date of Patent: Feb. 4, 2020

(54) ASSEMBLY, AND METHOD, FOR PROCESSING FRUIT AND VEGETABLE PRODUCTS

(71) Applicant: UNITEC S.P.A., Lugo (IT)

(72) Inventor: Luca Benedetti, Franzione Savarna (IT)

(73) Assignee: UNITEC S.P.A., Lugo (IT)

( * ) Notice: Subject to any disclaimer, the term of this patent is extended or adjusted under 35 U.S.C. 154(b) by 171 days.

(21) Appl. No.: 15/750,423

(22) PCT Filed: Aug. 2, 2016

(86) PCT No.: PCT/EP2016/068465
§ 371 (c)(1),
(2) Date: Feb. 5, 2018

(87) PCT Pub. No.: WO2017/021421
PCT Pub. Date: Feb. 9, 2017

(65) Prior Publication Data
US 2018/0257109 A1    Sep. 13, 2018

(30) Foreign Application Priority Data

Aug. 6, 2015    (IT) ................. 102015425842

(51) Int. Cl.
*G01G 11/04*    (2006.01)
*G01G 17/00*    (2006.01)
(Continued)

(52) U.S. Cl.
CPC .............. *B07C 5/3422* (2013.01); *B07C 5/22* (2013.01); *G01G 11/046* (2013.01); *G01G 17/00* (2013.01);
(Continued)

(58) Field of Classification Search
CPC .......... B07C 5/22; B07C 5/3422; B07C 5/36; B07C 2501/0081; B65G 2201/0211; G01G 11/046; G01G 11/003; G01G 17/00
(Continued)

(56) References Cited

U.S. PATENT DOCUMENTS 4,660,665 A * 4/1987 Powell, Jr. ........... G01G 11/003
177/1
4,817,744 A * 4/1989 Power, Jr. ................ B07C 5/18
177/145
(Continued)

FOREIGN PATENT DOCUMENTS

EP    1469301 A1    10/2004
EP    2343521 A2    7/2011
(Continued)

OTHER PUBLICATIONS

Computer translation of JP 2001-219129 downloaded Sep. 12, 2019 from the JPO website.*
(Continued)

*Primary Examiner* — Randy W Gibson
(74) *Attorney, Agent, or Firm* — Cantor Colburn LLP

(57) ABSTRACT

An assembly for processing fruit and vegetable products includes a plurality of units for containing fruit and vegetable products (A), which can move in sequence along a conveyance line. The assembly includes at least one vision element, arranged along the line and intended at least to check the actual number (N) of containment units on which each product (A) lies and is conveyed along the line, with such actual number (N) being able to depend randomly or otherwise on the size, shape, arrangement and/or method of loading on the line of the respective product (A). Downstream of the element there are at least one first device for weighing a first predefined number ($n_1$) of consecutive containment units and at least one second device for weigh- (Continued)

ing a second predefined number ($n_2$) of consecutive containment units.

8 Claims, 2 Drawing Sheets

(51) Int. Cl.
| | |
|---|---|
| *B07C 5/22* | (2006.01) |
| *B07C 5/34* | (2006.01) |
| *B07C 5/36* | (2006.01) |
| *B65G 17/06* | (2006.01) |
| *B07C 5/342* | (2006.01) |
| *G01G 11/00* | (2006.01) |

(52) U.S. Cl.
CPC ........ *B07C 5/36* (2013.01); *B07C 2501/0081* (2013.01); *B65G 2201/0211* (2013.01); *G01G 11/003* (2013.01)

(58) Field of Classification Search
USPC .................................................. 177/145, 119
See application file for complete search history.

(56) References Cited

U.S. PATENT DOCUMENTS

| | | | | |
|---|---|---|---|---|
| 5,990,422 | A * | 11/1999 | Komori | G01G 19/035 |
| | | | | 177/119 |
| 6,433,288 | B1 * | 8/2002 | Olafsson | G01G 11/046 |
| | | | | 177/145 |
| 6,481,579 | B2 * | 11/2002 | Kennedy | B07C 5/3422 |
| | | | | 198/448 |
| 7,279,645 | B1 * | 10/2007 | Inglin | G01G 11/046 |
| | | | | 177/145 |
| 10,094,702 | B2 * | 10/2018 | Laird | G01G 19/035 |
| 2011/0309004 | A1 * | 12/2011 | Morley | B07C 5/36 |
| | | | | 209/577 |

FOREIGN PATENT DOCUMENTS

| | | |
|---|---|---|
| JP | 067748 A | 1/1994 |
| JP | 2001219129 A | 8/2001 |
| JP | 2001334216 A | 12/2001 |
| WO | 2012039597 A2 | 3/2012 |

OTHER PUBLICATIONS

International Search Report dated Oct. 7, 2016 re: Application No. PCT/EP2016/068465; pp. 1-4; citing: JP 2001 219129 A, JP H06 7748 A, JP 2001 334216 A, EP 2 343 521 A2, WO 2012/039597 A2 and EP 1 469 301 A1.

Written Opinion dated Oct. 7, 2016 re: Application No. PCT/EP2016/068465; pp. 1-4; citing: JP 2001 219129 A, JP H06 7748 A, JP 2001 334216 A, EP 2 343 521 A2, WO 2012/039597 A2 and EP 1 469 301 A1.

* cited by examiner

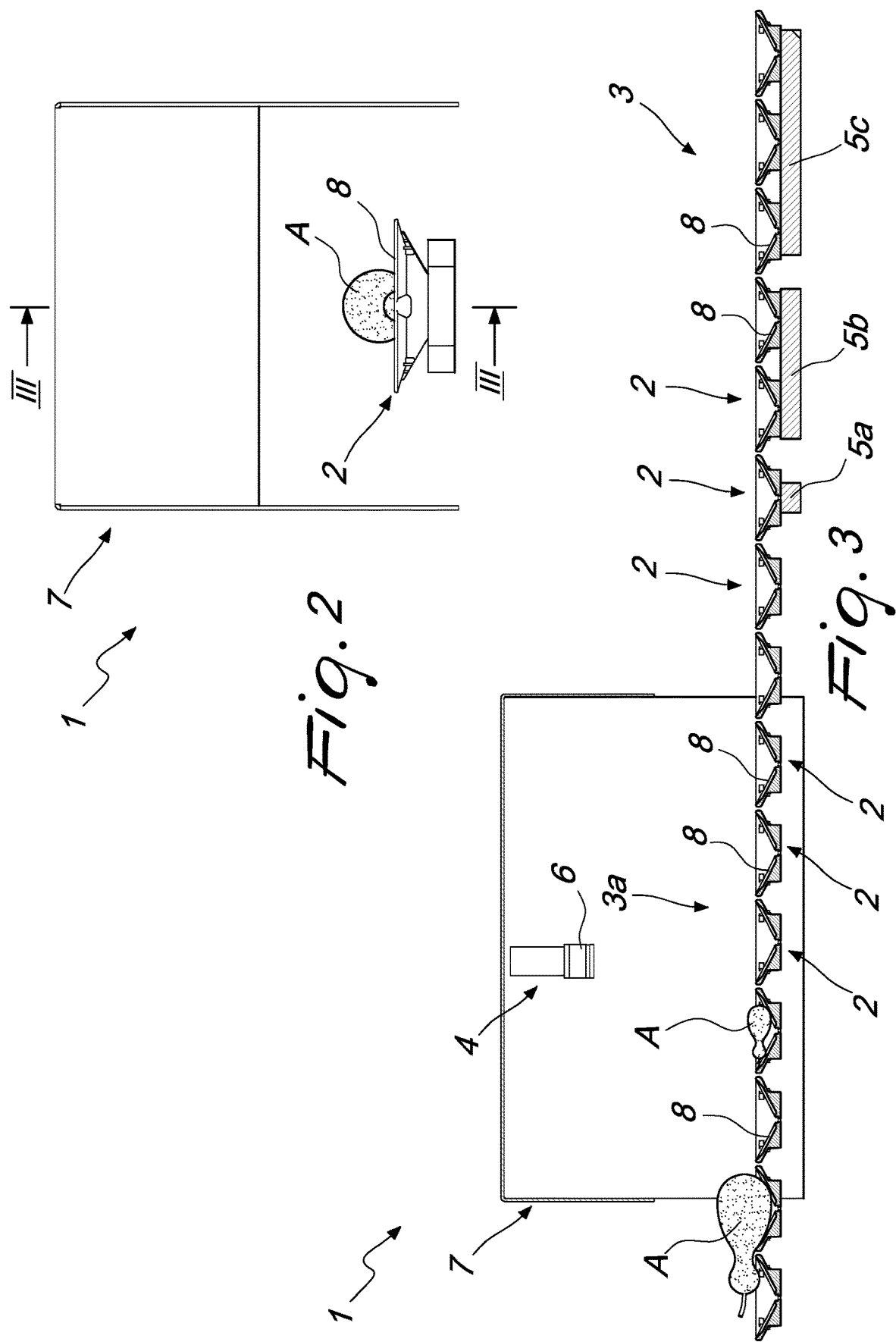

ASSEMBLY, AND METHOD, FOR PROCESSING FRUIT AND VEGETABLE PRODUCTS

TECHNICAL FIELD

The present disclosure relates to an assembly, and to a method, for processing fruit and vegetable products.

BACKGROUND

Nowadays, companies in the sector of distribution and marketing of fruit and vegetable products make ever-increasing use of highly automated lines and systems, which are used to carry out the necessary activities of movement, sizing, checking and packaging of fruit and vegetables.

In fact, as is known, only by way of a particularly high degree of automation it is possible to achieve high production volumes (such as, indeed, those required by the large-scale retail trade), while at the same time containing the processing times and the associated costs (of labor and logistics, especially).

Moreover, it should be noted that the peculiarity of each fruit and vegetable product, in terms of shape, size, structure, weight, defects, ripening path etc., impose different treatments and, more usually, pose different problems for makers of processing assemblies; therefore, dedicated adapted lines are often specially designed for each type of fruit (or vegetable).

In such context, one of the fruit and vegetable products that requires the greatest care, forcing designers to go to extremes, is without doubt the pear, whose particular shape structure leads to several difficulties, owing to the frequent impossibility of controlling its movement and placement with precision.

In more detail in fact, it should be noted that dedicated lines for the industrial processing of pears have, among other tasks, the task of weighing each one of them, while they are being moved along a predefined path.

According to conventional methods, the weighing is performed by a load cell conveniently arranged along the line, so as to act on each pear in transit, while this is conveyed toward the stations downstream by adapted containment units (sometimes called "cups").

The load cell is therefore designed to weigh each cup and, with it, the pear conveyed thereby.

Such implementation solution is not however devoid of drawbacks.

It should be noted in fact that each pear is deposited on the line at an upstream station, at which each fruit is released and transferred to a corresponding cup by gravity and/or rolling, optionally by way of the use of special delivery and transfer elements.

In any case, in the moments following the delivery (and during its travel along the line), the pear can randomly and entirely unpredictably vary its arrangement, by oscillating or rotating about its center of gravity, and thus it is possible for it to be moved according to different inclinations.

With the variation of inclinations, especially when the pear tips on one side, the number of cups on which that pear rests and distributes its weight (often not evenly, moreover) also varies.

Furthermore, more simply, it should be noted that the number of cups on which the pear distributes the weight can vary as a function of the size of that pear (again, this is totally unpredictable).

It thus appears evident that when such circumstance arises, the load cell (which as has been seen checks in sequence the weight of each cup in transit) will perform a measurement that is totally incorrect, rendering the entire activity unreliable and ineffective.

Moreover, it is likewise clear that the problem cannot be resolved by using load cells that are designed in advance to act on pairs of adjacent cups, or on another number of contiguous cups chosen at installation time, since the random nature of the size and of the arrangement assumed by each pear (and therefore of the number of cups affected in each instance) would still make the measurement unreliable.

SUMMARY

The aim of the present disclosure is to solve the above mentioned problems, by providing an assembly for processing fruit and vegetable products, such as for example pears, that is capable of performing the weighing thereof precisely and reliably.

Within this aim, the disclosure provides a method of processing fruit and vegetable products, such as for example pears, which can move along a transfer line, that makes it possible to determine the weight thereof precisely and reliably.

The disclosure also provides an assembly and a method that ensure an exact and correct determination of the weight of each fruit and vegetable product processed, independently of its size and/or shape and/or arrangement assumed in each instance during the transfer.

The disclosure further provides an assembly that ensures a high reliability of operation.

The disclosure also provides an assembly that adopts an alternative technical and structural architecture to those of conventional assemblies.

The disclosure further provides an assembly that can be easily implemented using elements and materials that are readily available on the market.

The disclosure also provides an assembly and a method that are low cost and safely applied.

This aim and these and other advantages are achieved by providing an assembly for processing fruit and vegetable products, which comprises a plurality of units for containing fruit and vegetable products, which can move in sequence along a conveyance line, characterized in that it comprises at least one vision element, arranged along said line and intended at least to check the actual number of said containment units on which each product lies and is conveyed along said line, said actual number being able to depend randomly or otherwise on the size, shape, arrangement and/or method of loading on said line of the respective product, downstream of said at least one element there being at least one first device for weighing a first predefined number of said consecutive containment units and at least one second device for weighing a second predefined number of said consecutive containment units, which is different from said first number, for each fruit and vegetable product conveyed along said line said first weighing device and said second weighing device being activatable selectively by an electronic control and management unit, as a function of the respective actual number detected by said at least one vision element, for weighing said predefined number of said consecutive containment units that corresponds to the actual number of said containment units on which each fruit and vegetable product is conveyed.

This aim and these and other advantages are also achieved by providing a method for processing fruit and vegetable products, which includes the following steps: arranging each fruit and vegetable product to be processed on at least one from a plurality of units for containing fruit and vegetable products, which can move in sequence along a conveyance line; checking, during transport, by way of at least one respective vision element arranged along said line, at least the actual number of said containment units on which each product lies and is conveyed along said line, said actual number being able to depend randomly or otherwise on the size, shape, arrangement and/or manner of loading on said line of the respective product; activating selectively, by way of an electronic control and management unit, one of at least one first device for weighing a first predefined number of said consecutive containment units, and at least one second device for weighing a second predefined number of said consecutive containment units which is different from said first number, as a function of the respective actual number detected by said at least one vision element, for weighing said predefined number of said consecutive containment units that corresponds to the actual number of said containment units on which each fruit and vegetable product is conveyed.

BRIEF DESCRIPTION OF THE DRAWINGS

Further characteristics and advantages of the disclosure will become better apparent from the detailed description of a preferred, but not exclusive, embodiment of the assembly and of the method according to the disclosure, with the assembly illustrated by way of non-limiting example in the accompanying drawings, wherein:

FIG. 2 is a front elevation view of the assembly in FIG. 1; and

FIG. 3 is a cross-sectional view of FIG. 2 taken along the line III-III.

DETAILED DESCRIPTION OF THE DRAWINGS

Figure 1:
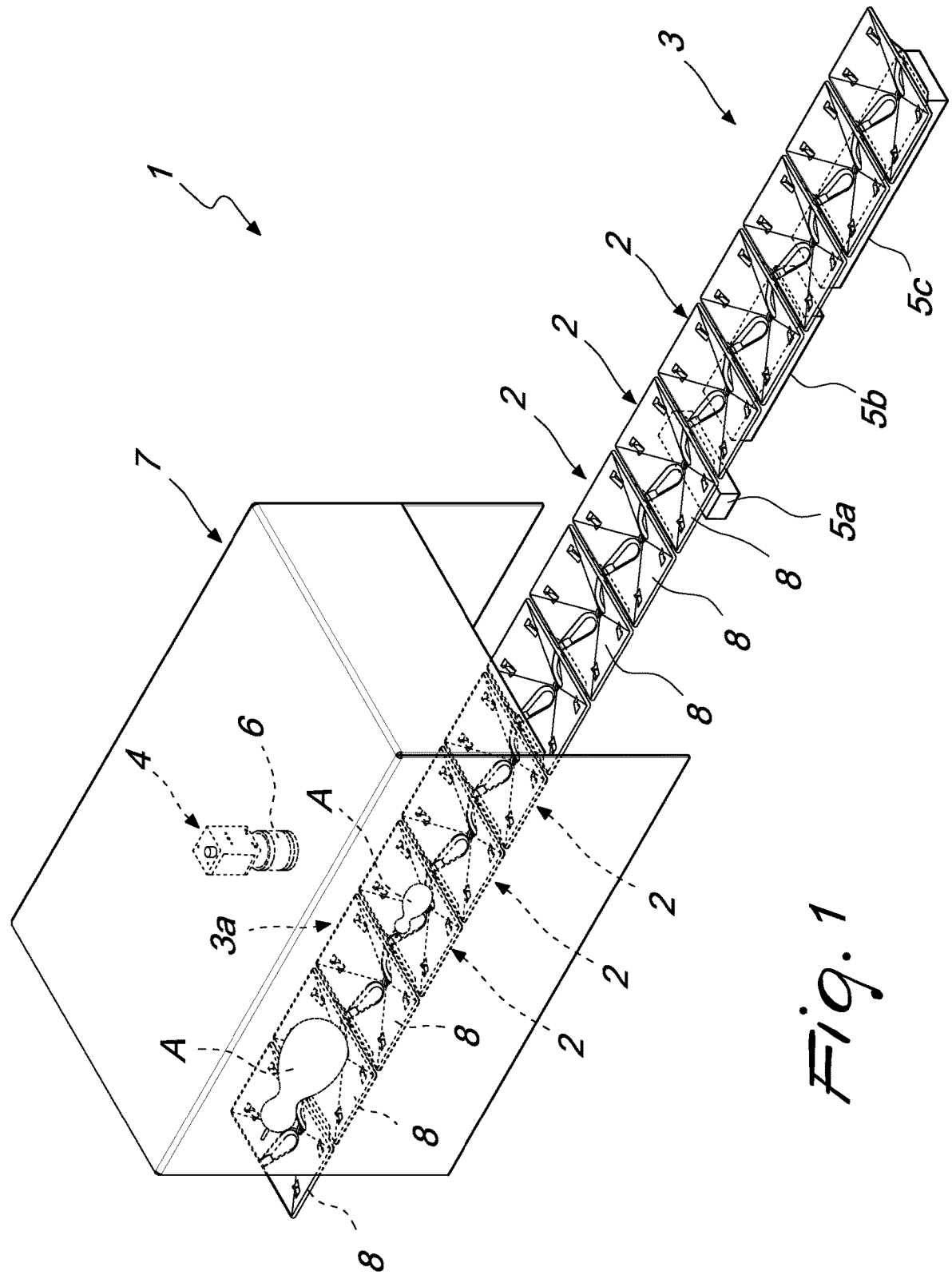
FIG. 1 is a perspective view of the assembly according to the disclosure.

With reference to FIGS. 1-3, the reference numeral 1 generally designates an assembly for processing fruit and vegetable products A, which comprises a plurality of units 2 for containing fruit and vegetable products A, and the latter can move in sequence along a conveyance line 3.

It should be noted from this point onward that in the preferred application of the disclosure, to which reference will often be made in the present discussion, the fruit and vegetable products A are pears, whose peculiar shape structure (and variability of size) makes it very difficult to foresee the arrangement assumed during the transfer along the line 3, and, especially, the number of consecutive containment units 2 affected in each instance.

In any case it should be emphasized that the possibility is not ruled out of using the assembly 1 according to the disclosure for processing other fruits or fruit and vegetable products A in general, while remaining within the scope of protection claimed herein.

According to the disclosure, the assembly 1 comprises at least one vision element 4, arranged along the line 3 and intended to at least check the actual number (generically referred to as "N" in the present discussion) of containment units 2 on which each product A lies and is conveyed along the line 3.

It should be noted from this point onward that the actual number N is not usually defined in advance (and it is precisely this fact that leads to the problems that the disclosure sets out to resolve). The actual number N in fact identifies (for each pear or other product A conveyed), a value that can depend, randomly or otherwise, on the size, shape, arrangement and/or method of loading on the line 3, of the respective product A.

For example, it should be noted that, in the figures shown, a condition is schematically represented in which two pears are moving along the line 3: the upstream one is larger and therefore lies on two containment units 2 (for this one therefore N=2), while the second, smaller one lies on and is conveyed by a single containment unit 2 (N=1).

It should be noted moreover that both of the pears shown have the same alignment (which coincides with the direction of movement of the containment units 2 along the line 3): conversely, as has already been observed, in practice the variability of the actual number N can also depend, irrespective of whether the size is the same, on the different orientation assumed by each pear (or on other factors, such as those given earlier merely for the purposes of example).

In any case, arranged downstream of the element 4, as has been seen, and intended for the detection at least of the actual number N for each pear or other fruit and vegetable product A, is at least one first device 5a for weighing a first predefined number $n_1$ of consecutive containment units 2.

In the example shown merely for the purposes of non-limiting illustration in the accompanying figures, the first weighing device 5a acts on a single containment unit 2 in transit ($N_1$=1), and therefore it can for example effectively determine the weight of the second pear (the downstream one) illustrated in FIGS. 1 and 2.

Furthermore, arranged downstream of the element 4 is at least one second device 5b for weighing a second predefined number $n_2$ of consecutive containment units 2, which is conveniently chosen to be different from the first number $n_1$.

With further reference to the accompanying figures, it should be noted that, in such embodiment, for the second device 5b $n_2$=2: the latter therefore is capable of effectively performing the weighing of pears that lie on two consecutive containment units 2, like the first pear shown in the figures (the one arranged upstream).

In any case, and for each fruit and vegetable product A conveyed along the line 3, the first device 5a and the second device 5b can be activated selectively by an electronic control and management unit (which may be conventional), as a function of the respective actual number N detected by the vision element 4.

In activating the respective device for weighing 5a, 5b, 5c, the control and management unit therefore ensures the weighing of a predefined number $n_1$, $n_2$, $n_3$ of consecutive containment units 2, corresponding to the actual number N of containment units 2 on which each fruit and vegetable product A is conveyed.

More precisely, in actuating each device 5a, 5b, 5c the control and management unit automatically weighs the corresponding predefined number $n_1$, $n_2$, $n_3$ of consecutive containment units 2: since the weight of each containment unit 2 is known, by calculating the difference, and as desired, the weight is obtained of the fruit and vegetable product A conveyed in each instance by the consecutive containment units 2 that are weighed.

This makes it possible from this point onward to achieve the set aim, in that the assembly 1 carries out the weighing of all and only the containment units 2 on which each product A lies and is conveyed, therefore ensuring an exact and reliable result.

It should be noted that the electronic control and management unit can be a controller, a computer, a PC, or any other mechanism capable of receiving the data item corresponding to the actual number N, sent by the element 4, and of activating as a consequence, selectively, the corresponding weighing device 5a, 5b, 5c.

Conveniently, and as a function of the heterogeneity envisaged and detectable in the reference parameters of the fruit and vegetable products A to be transported and weighed, the assembly 1 according to the disclosure can comprise a plurality of weighing devices 5a, 5b, 5c.

Each device 5a, 5b, 5c can thus be used to weigh a respective predefined number $n_1$, $n_2$, $n_3$ of consecutive containment units 2, which is different from the predefined number $n_1$, $n_2$, $n_3$ weighed by the other devices 5a, 5b, 5c.

Indeed, it should be noted that in the accompanying figures an embodiment is shown for the purposes of example in which the assembly 1 comprises three weighing devices 5a, 5b, 5c: the first weighing device 5a intended to weigh single containment units 2 ($n_1=1$), the second device 5b capable of detecting the weight of pairs of consecutive containment units 2 ($n_2=2$) and the third device 5c intended to weigh triads of consecutive containment units 2 ($n_3=3$).

Once again it should be emphasized that the possibility is not ruled out of providing assemblies 1 provided with four or more weighing devices 5a, 5b, 5c, at least one of which is intended optionally for weighing four or more consecutive containment units 2. It is likewise envisaged, for reasons of safety, double checking, or other applicative requirements, to have assemblies 1 according to the disclosure in which some of the weighing devices 5a, 5b, 5c provided weigh the same predefined number $n_1$, $n_2$, $n_3$ of consecutive containment units 2.

In the preferred embodiment, cited by way of non-limiting illustration of the application of the disclosure, each device for weighing 5a, 5b, 5c comprises (or is constituted by) a load cell, arranged below the transit trajectory of the containment units 2, while they are conveying the pears to be weighed, downstream of the vision element 4.

Each load cell is therefore designed to weigh the respective predefined number $n_1$, $n_2$, $n_3$ of consecutive containment units 2, which is different from the predefined number $n_1$, $n_2$, $n_3$ weighed by the other load cells.

The scope of protection claimed herein includes the adoption of any type of load cell, be it electronic or otherwise; furthermore, it should in any case be noted that the possibility is not ruled out of using other types of transducers or sensors (different therefore from load cells) in order to obtain the necessary weighing of the containment units 2 and of the pears conveyed thereby.

Advantageously, the vision element 4 comprises a video camera 6, directed toward a first portion 3a of the line 3, while the previously-described weighing devices 5a, 5b, 5c are arranged downstream of the first portion 3a.

It should likewise be noted that the possibility is not ruled out of equipping the assembly 1 with two or more elements 4, each one of which optionally comprises a respective video camera 6, for the purpose for example of increasing the capacity and efficacy of vision.

The video camera 6 (and more generally the vision element 4) will therefore be provided with adapted instruments (software) for analyzing and processing the images, conventional or otherwise, in order to identify the actual number N of containment units 2 on which in each instance each pear in transit is lying and is conveyed. Furthermore, according to conventional methods, each video camera 6 and/or each vision element 4 will be capable of communicating with the electronic control unit, transmitting in fact the actual number N associated with each pear.

Moreover, the possibility is not ruled out of equipping the video camera 6 or in any case the vision element 4 with further means of analysis: for example, the video camera 6 can be used to carry out qualitative analysis on the pears, checking their coloring, degree of ripening and/or for the presence of defects (on the surface or in the pulp), and other properties and parameters of possible interest.

Conveniently, to reduce light interference and therefore enable the video camera 6 and/or the vision element 4 to best operate, the first portion 3a of the line 3 is contained in a tunnel 7, which is open at the respective ends (for the entry and exit of the containment units 2 and of the pears).

In such embodiment, and as incidentally can be clearly seen from the accompanying FIGS. 1 and 2, the video camera 6 is hung from the ceiling of the tunnel 7 (and directed downward, in order to frame the first portion 3a, or at least a section thereof). It is envisaged further to provide video cameras 6 that are variously inclined with respect to the perpendicular at the first portion 3a, according to the specific requirements.

In the preferred embodiment, shown in the accompanying figures by way of non-limiting example of the application of the disclosure, each containment unit 2 is constituted substantially by a tray 8 shaped substantially like an open inverted pyramid, which is entrained along the line 3 by a respective movement apparatus.

So in fact, it should be noted that each containment unit 2 is of the type sometimes referred to as a "cup", intended to receive each pear (or a part thereof) in the concavity defined by the (open) inverted pyramid shape.

The subject matter of the present discussion also relates to a method of processing fruit and vegetable products A (be they pears or other products).

The method according to the disclosure involves, in a step a., arranging each fruit and vegetable product A to be processed on at least one from a plurality of units 2 for containing fruit and vegetable products A, which can move in sequence along a conveyance line 3.

Subsequently, while the fruit and vegetable products A are moving conveyed by the containment units 2, the method entails, in a step b., checking, by way of a respective vision element 4 arranged along the line 3, at least the actual number N of containment units 2 on which each product A lies and is conveyed along the line 3.

As discussed earlier, such actual number N can depend randomly or otherwise on the size, shape, arrangement and/or manner of loading on the line 3 of the respective product A (and may be variable from pear to pear).

After checking the actual number N in step b., the method according to the disclosure entails, in a step c., activating selectively, by way of an electronic control and management unit, one of at least one first weighing device 5a and at least one second weighing device 5b (while not ruling out, as previously noted for the assembly 1, the possibility of implementing the method using three or more weighing devices 5a, 5b, 5c).

The first device 5a is therefore intended to weigh a first predefined number $n_1$ of consecutive containment units 2, and similarly the second device 5b is intended to weigh a second predefined number $n_2$ of consecutive containment units 2, conveniently chosen to be different from the first.

The selective activation by the electronic unit, in step c. of the method according to the disclosure, therefore occurs as a function of the respective actual number N detected by the vision element 4, so as to weigh the predefined number $n_1$, $n_2$, $n_3$ of consecutive containment units 2 corresponding to the actual number N of containment units 2 on which each fruit and vegetable product A is conveyed.

At least one of step a., step b., and step c., can be carried out by way of an assembly 1 that has one or more of the peculiarities described in the foregoing pages.

Operation of the assembly and execution of the method according to the disclosure are therefore clear in light of the discussion up to this point.

As has previously been seen in fact, the assembly 1 is first and foremost designed to convey pears or other fruit and vegetable products A along a line 3, for example in order to transfer them to other work centers or stations, and/or in order to provide for their packaging.

To this end therefore, the pears are first of all loaded onto one or more containment units 2: the loading can occur according to various methods (while remaining within the scope of protection claimed herein), and such method, as with the size, shape, arrangement (or other factor) can determine a different actual number N of containment units 2 on which each pear lies and is conveyed.

Such actual number N is detected by the vision element 4 and it is sent by the latter to the electronic control and management unit.

Arranged downstream of the vision element 4 are two or more weighing devices 5a, 5b, 5c (as a function of the possible values that it is expected the actual number N can take), each one of which is preset in advance to weigh a predefined number $n_1$, $n_2$, $n_3$ (different from the others) of consecutive containment units 2 in transit.

Thus, for each pear, of such weighing devices 5a, 5b, 5c the electronic unit activates the one intended to weigh the predefined number $n_1$, $n_2$, $n_3$ that corresponds to the actual number N of containment units 2 on which the pear itself lies and is conveyed.

It therefore appears to be clear that the assembly 1 and the method achieve the set aim: for each pear in fact, the weighing is activated of all and only the containment units 2 on which the pear lies, thus ensuring a measuring that is reliable and error-free.

In fact, being able to draw on two or more weighing devices 5a, 5b, 5c, which are designed to weigh different predefined numbers $n_1$, $n_2$, $n_3$ of consecutive containment units 2, whatever the arrangement and/or orientation and/or size of the pear, the control and management unit as a consequence varies the choice of the load cell (or other weighing device 5a, 5b, 5c), always and only using the appropriate one (the one such that the predefined number $n_1$, $n_2$, $n_3$ corresponds to the actual number N).

In practice it has been found that the assembly and the method according to the disclosure fully achieve the set aim and objects, in that the use of a vision element, adapted to recognize the actual number of containment units on which each fruit and vegetable product lies and is conveyed, and the sending of such information to an electronic control and management unit which as a consequence activates the most appropriate weighing device arranged downstream, makes it possible to provide an assembly, and to carry out a method, that ensures the weighing of fruit and vegetable products precisely and reliably.

The disclosure, thus conceived, is susceptible of numerous modifications and variations, all of which are within the scope of the appended claims Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in Italian Patent Application No. 102015000042584 (UB2015A002968) from which this application claims priority are incorporated herein by reference.

The invention claimed is:

1. An assembly for processing fruit and vegetable products, which comprises a plurality of units for containing fruit and vegetable products, which can move in sequence along a conveyance line, comprising at least one vision element, arranged along said line and intended at least to check the actual number of said containment units on which each product lies and is conveyed along said line, said actual number being able to depend randomly or otherwise on the size, shape, arrangement and/or method of loading on said line of the respective product, downstream of said at least one vision element there being at least one first device for weighing a first predefined number of said consecutive containment units and at least one second device for weighing a second predefined number of said consecutive containment units, which is different from said first number, for each fruit and vegetable product conveyed along said line said first weighing device and said second weighing device being activatable selectively by an electronic control and management unit, as a function of the respective actual number detected by said at least one vision element, for weighing said predefined number of said consecutive containment units that corresponds to the actual number of said containment units on which each fruit and vegetable product is conveyed.

2. The assembly according to claim 1, further comprising a plurality of said weighing devices, each one of said devices being intended to weigh a respective said predefined number of said consecutive containment units, which is different from said predefined number weighed by the other said devices.

3. The assembly according to claim 2, wherein each one of said weighing devices comprises a load cell, arranged below the transit trajectory of said containment units, downstream of said at least one vision element, each one of said load cells being intended to weigh the respective said predefined number of said consecutive containment units, which is different from said predefined number weighed by the other said load cells.

4. The assembly according to claim 1, wherein said at least one vision element comprises a video camera, directed towards a first portion of said line, said devices being arranged downstream of said first portion.

5. The assembly according to claim 4, wherein said first portion of said line is contained in a tunnel which is open at the respective ends, said video camera being hung from the ceiling of said tunnel.

6. The assembly according to claim 1, wherein each one of said containment units is constituted substantially by a tray which is shaped substantially like an open inverted pyramid and is entrained along said line by a respective movement apparatus.

7. A method for processing fruit and vegetable products, the method including the following steps:
   a. arranging each fruit and vegetable product to be processed on at least one from a plurality of units for containing fruit and vegetable products, which can move in sequence along a conveyance line,
   b. checking, during transport, by way of at least one respective vision element arranged along said line, at least the actual number of said containment units on which each product lies and is conveyed along said line, said actual number being able to depend randomly or otherwise on the size, shape, arrangement and/or manner of loading on said line of the respective product, and c. activating selectively, by way of an electronic control and management unit, one of at least one first device for weighing a first predefined number of said consecutive containment units, and at least one second device for weighing a second predefined number of said consecutive containment units which is different from said first number, as a function of the respective actual number detected by said at least one vision element, for weighing said predefined number of said consecutive containment units that corresponds to the actual number of said containment units on which each fruit and vegetable product is conveyed.

8. The method according to claim 7, wherein at least one from said step a., said step b., and said step c. is performed by means of an assembly for processing fruit and vegetable products, wherein the assembly comprises a plurality of units for containing fruit and vegetable products, which can move in sequence along a conveyance line, comprising at least one vision element, arranged along said line and intended at least to check the actual number of said containment units on which each product lies and is conveyed along said line, said actual number being able to depend randomly or otherwise on the size, shape, arrangement and/or method of loading on said line of the respective product, downstream of said at least one vision element there being at least one first device for weighing a first predefined number of said consecutive containment units and at least one second device for weighing a second predefined number of said consecutive containment units, which is different from said first number, for each fruit and vegetable product conveyed along said line said first weighing device and said second weighing device being activatable selectively by an electronic control and management unit, as a function of the respective actual number detected by said at least one vision element, for weighing said predefined number of said consecutive containment units that corresponds to the actual number of said containment units on which each fruit and vegetable product is conveyed.

* * * * *